(12) United States Patent
Kostamovaara (10) Patent No.: US 11,300,666 B2
(45) Date of Patent: Apr. 12, 2022

(54) DISTANCE MEASURING DEVICE AND TRANSMITTER, RECEIVER AND METHOD THEREOF

(71) Applicant: OULUN YLIOPISTO, Oulu (FI)

(72) Inventor: Juha Kostamovaara, Oulu (FI)

(73) Assignee: OULUN YLIOPISTO, Oulu (FI)

( * ) Notice: Subject to any disclaimer, the term of this patent is extended or adjusted under 35 U.S.C. 154(b) by 726 days.

(21) Appl. No.: 16/092,980

(22) PCT Filed: Apr. 13, 2017

(86) PCT No.: PCT/FI2017/050279
§ 371 (c)(1),
(2) Date: Oct. 11, 2018

(87) PCT Pub. No.: WO2017/178711
PCT Pub. Date: Oct. 19, 2017

(65) Prior Publication Data
US 2019/0137607 A1  May 9, 2019

(30) Foreign Application Priority Data

Apr. 13, 2016 (FI) .................................... 20165316

(51) Int. Cl.
*G01S 7/484* (2006.01)
*G01S 7/4865* (2020.01)
(Continued)

(52) U.S. Cl.
CPC ............ *G01S 7/484* (2013.01); *G01S 7/4863* (2013.01); *G01S 7/4865* (2013.01); *G01S 17/10* (2013.01); *G01S 17/894* (2020.01)

(58) Field of Classification Search
CPC ........ G01S 7/484; G01S 17/89; G01S 17/894; G01S 7/4863; G01S 7/4865; G01S 17/10;
(Continued)

(56) References Cited

U.S. PATENT DOCUMENTS 8,320,423 B2  11/2012  Stern
8,681,321 B2   3/2014  Pelman et al.
(Continued)

FOREIGN PATENT DOCUMENTS

EP   2 469 294   6/2012
EP   2 469 301   6/2012
(Continued)

OTHER PUBLICATIONS

International Search Report for PCT/FI2017/050279, dated Jul. 14, 2017, 3 pages.
(Continued)

*Primary Examiner* — Luke D Ratcliffe
(74) *Attorney, Agent, or Firm* — Nixon & Vanderhye PC (57) ABSTRACT

An optical time-of-flight distance measuring device comprises a transmitter and a receiver. The transmitter comprises a semiconductor laser for outputting optical pulses of controllably variable temporal widths. The semiconductor laser operates in an enhanced switching regime for the optical pulses of a minimum generable temporal width of the laser. The receiver comprises a matrix of single photon avalanche detector elements of a Geiger mode, a receiver controller, and one or more time-to-digital converters. The single photon avalanche detector elements detect optical pulses reflected from the target to the matrix, and each of the single photon avalanche detector element outputs an electric signal in response to each detection. A number of the time-to-digital converters is smaller than a number of the single photon avalanche detector elements of the matrix. The receiver controller connects at least two of the single photon avalanche detector elements with different time-to-digital converters. The time-to-digital converters connected with the single photon avalanche detector elements provide timings of detected optical pulses on the basis of each output
(Continued)

electrical signal for determination of information associated with a distance of the target.

20 Claims, 8 Drawing Sheets

(51) Int. Cl.
*G01S 17/10* (2020.01)
*G01S 17/894* (2020.01)
*G01S 7/4863* (2020.01)

(58) Field of Classification Search
CPC . G01S 17/08; G01S 17/18; G01C 3/08; G01J 1/44
See application file for complete search history.

(56) References Cited

U.S. PATENT DOCUMENTS

| | | |
|---|---|---|
| 8,934,514 B2 | 1/2015 | Kostamovaara et al. |
| 2011/0134951 A1 | 6/2011 | Ryvkin et al. |
| 2013/0235366 A1* | 9/2013 | Giacotto ................ G01S 7/484 356/5.01 |
| 2013/0300840 A1 | 11/2013 | Borowski |
| 2015/0177369 A1* | 6/2015 | Kostamovaara ........ G01S 17/18 356/5.08 |
| 2015/0285625 A1 | 10/2015 | Deane |
| 2015/0373322 A1 | 12/2015 | Goma et al. |

FOREIGN PATENT DOCUMENTS

| | | |
|---|---|---|
| EP | 2 637 038 | 9/2013 |
| EP | 2 677 340 | 12/2013 |
| EP | 2 759 848 | 7/2014 |
| EP | 2 887 096 | 6/2015 |
| EP | 2 957 926 | 12/2015 |
| WO | 2008/152647 | 12/2008 |

OTHER PUBLICATIONS

Written Opinion of the ISA for PCT/FI2017/050279, dated Jul. 14, 2017, 7 pages.
FI Search Report for FI20165316, dated Oct. 31, 2016, 2 page.
Juha Kostamovaara et al.,"On Laser Ranging Based on HighSpeed/ Energy Laser Diode Pulses and Single-Photon Detection Techniques", IEEE Photonics Journal, vol. 7, No. 2, Apr. 2015, pp. 1-15. DOI:10.1109/JPHOT.2015.2402129.
Office Action dated Nov. 12, 2021 in corresponding European Application No. 17720177.9, 7 pages.

* cited by examiner

DISTANCE MEASURING DEVICE AND TRANSMITTER, RECEIVER AND METHOD THEREOF

This application is the U.S. national phase of International Application No. PCT/FI2017/050279 filed 13 Apr. 2017, which designated the U.S. and claims priority to FI Patent Application No. 20165316 filed 13 Apr. 2016, the entire contents of each of which are hereby incorporated by reference.

FIELD

The invention relates to a distance measuring device and a transmitter, a receiver and a method thereof.

BACKGROUND

Various applications such as automobile safety devices, laser radars, 3D imaging, laser tomography, time imaging spectroscopy, etc., require optical sources which generate high-power (10 W to 1000 W) single optical pulses in the picosecond range. The reflections of the optical pulses generated by a laser are detected in a detector for determining timing for the detections. Then, a distance to a target may be determined and its 3D image may be formed on the basis of the timing moments. However, there are shortages in transmission of the optical pulses and in their detections. Hence, there is a need to improve the distance measurement.

BRIEF DESCRIPTION

The present invention seeks to provide an improvement in the measurements. According to an aspect of the present invention, there is provided a transmitter of an optical time-of-flight distance measuring device as specified in claim 1.

According to another aspect of the present invention, there is provided a receiver of an optical time-of-flight distance measuring device in claim 4.

According to another aspect of the present invention, there is provided an optical time-of-flight distance measuring device in claim 13.

According to another aspect of the present invention, there is provided an optical time-of-flight distance measuring method in claim 15.

The invention has advantages. The duration of the optical pulse can be controlled with respect to the measured distance. The detection, in turn, can be performed with a smaller number of time-to-digital converters than the number of detecting elements in a detector matrix.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

In the present application, optical radiation refers to electromagnetic radiation at wavelengths between 40 nm to 1 mm. Semiconductor lasers generate typically visible or infrared light. One or more narrow or broad bands of the optical radiation may be utilized. A bandwidth of a semiconductor laser may be less than a few tens of nanometers without restricting to this.

Figure 1:
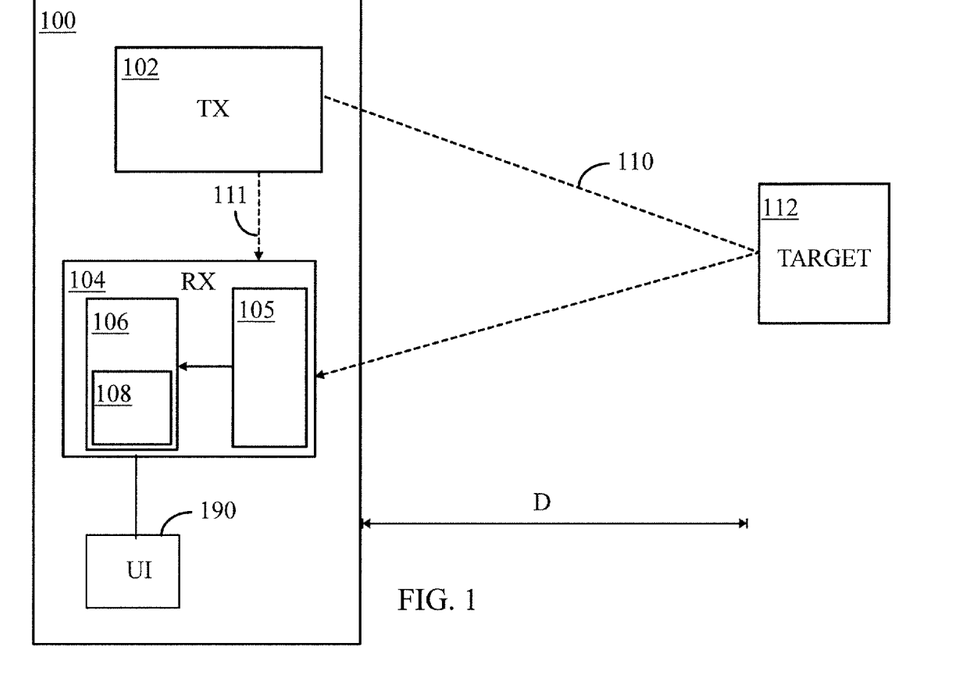
FIG. 1 illustrates an example of a time-of-flight distance measurement device.

In FIG. 1, a block diagram of a distance measurement device 100 for measuring a distance D between the apparatus 100 and a target 112 on the basis of time-of-flight of an optical pulse is shown. The target 112 may be any object that reflects at least part of the optical pulse 110 back in the direction of the receiver 104 of the distance measurement device 100.

The distance measurement device 100 may be, for example, a pulsed laser distance measuring device or any apparatus capable of measuring a distance by transmitting and receiving at least one optical pulse. In FIG. 1, only the logical elements required for understanding the structure of the distance measurement device 100 are shown. Other components or elements have been omitted for reasons of simplicity. It is apparent to a person skilled in the art that the apparatus 100 for measuring a distance to the target 112 may also comprise other functions, components and structures. Moreover, the connections shown with lines in FIG. 1 are logical connections, and the actual physical connections may be different.

The distance measurement device 100 comprises a transmitter 102 that may transmit an optical pulse 110 towards the target 112. The distance measurement device 100 also comprises a receiver 104 that may receive the optical pulse 110 reflected from the target 112. A measuring unit 106 of the device 100 may measure a time interval between the transmission and reception of the optical pulse 110.

The measuring unit 106 may be a part of the receiver 104 or it may be outside of the receiver 104. The measuring unit 106 comprises at least one time-to-digital converter. A reception of an optical pulse and its timing may be based on detection of amplitude crossing a predefined amplitude threshold level with respect to a time scale. In general, the reception may be based on any suitable property crossing a predetermined threshold. The determination whether the property crosses the predetermined threshold may be performed digitally or analogically.

The optical pulse 110 transmitted from the transmitter 102 is shown in a dotted line. The transmitter 102 and the receiver 104 may be connected such that the optical pulse 110 transmitted towards the target 112 may also be simultaneously transmitted to the receiver 104 as well (shown also with a dashed line). The optical pulse 110 may be transmitted to the receiver 104 via a mirror, a lens, a prism or the like that directs part of the optical pulse 110 transmitted towards the target 112 to the receiver 104 as a reference pulse 111, or the transmitter 102 may directly transmit another electrical or optical pulse to the receiver 104 as the reference pulse 111. The reference pulse 111 has a determined temporal dependence on the optical pulse transmitted towards the target 112. That is a moment of the transmission of an optical pulse towards the target 112 and it is a timing signal for a measuring unit 106 to start measuring time between the transmission and reception of the optical pulse.

The transmitter 102 may transmit optical pulses repeatedly. The repetition of the optical pulses may be regular or irregular. The repetition may have a certain frequency, for example.

The transmitter 102 comprises a pulsed semiconductor laser which may transmit short optical pulses. The laser may comprise at least one bulk laser, quantum-well laser, vertical-cavity surface-emitting laser (VCSEL). The laser may be an array of the bulk lasers, quantum-well lasers, VCSEL lasers or any combination of them. The duration of the optical pulses may range from a femtoseconds to tens of nanoseconds, for example. As an example, the shortest optical pulse width may be about 50 ps, for example. As an example, the longest optical pulse width may be about 10 ns, for example. The duration of the optical pulse may be controllable. The power of the optical pulse may range from one watt to hundreds of watts, for example. As an example, the power of the optical pulse may be about 20 W, for example.

The receiver 104 may comprise a detector 105 that detects the optical pulse 110 reflected from the target 112. The detector 105 may also detect the reference pulse 111. The detector 105 may have more than one detector elements. The detector 105 may comprise an array of detector elements. The receiver 104 may form an image of the target 112 on the detector 105. The image may be formed with at least one lens and/or at least one curved-surface mirror.

When the receiver 104 receives the optical pulse 110 reflected from the target 112 and/or its environment, the moment of the arrival of the optical pulse 110 may be the time when the detector 105 detects it. A reflected optical pulse from the target 112 then acts as a timing signal for the measuring unit 106 to determine time between the transmission and the reception of the optical pulse.

Similarly, a moment of the transmission of the optical pulse 110 from the transmitter 102 may correspondingly be detected by the detector 105 on the basis of the optical or electrical reference pulse 111 received by the receiver 104.

As explained, the apparatus 100 may comprise the measuring unit 106 for measuring the time interval between the transmission and the detection of the optical pulse 110. The detector 105 and the measuring unit 106 may be connected such that the detector 105 may inform the measuring unit 106 about the arrivals of the pulses 110, 111 and the measuring unit 106 may determine their timing.

The measuring unit 106 may comprise a time-to-digital converter, at least one digital signal processor and memory 108 provided with suitable software embedded on a computer readable medium, or by separate logic circuits, for example with an application specific integrated circuit (ASIC). The measuring unit 106 may comprise an input/output (I/O) interface, such as a computer port for providing communication and signalling capabilities. The measuring unit 106 may comprise a clock for synchronized operation, timing the detections of optical pulses on the basis of electrical pulses from the detector 105 and measuring time related to transmission and reception moments of optical pulses.

Figure 2:
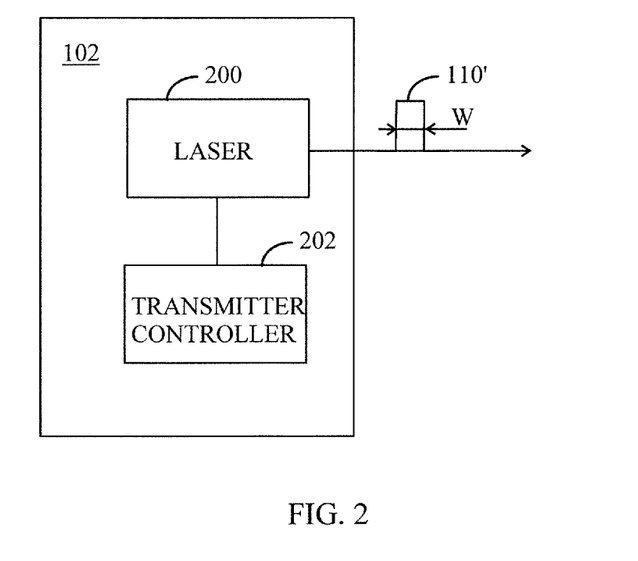
FIG. 2 illustrates an example of a transmitter of the time-of-flight distance measurement device.

The transmitter 102, which is illustrated in FIG. 2, comprises a semiconductor laser 200 which outputs optical pulses 110', 110 of controllably variable temporal widths. The semiconductor laser 200 operates in an enhanced gain switching regime for the optical pulses 110', 110 which have a minimum temporal width the laser 200 can generate.

A transmitter controller 202 of the transmitter 102 may receive information about a required duration of the optical pulse 110' and may control a duration W of the optical pulse 110' on the basis of said information. In an embodiment, the information about the required duration of the optical pulse may be based on an estimated distance to be measured.

In an embodiment, the controller 202 may cause the laser 200 to start the measurement with an optical pulse, and increase the temporal width of the optical pulses as long as a reflection from the target 112 is received by the receiver 104 or the maximum length of the optical pulses the laser 200 can output is reached. The longer the optical pulse is, the more energy it conveys. The more energetic optical pulse is transmitted, the more probable its reflection from the target 112 is irrespective of the distance between the transmitter 102 and the target 112. The peak power of the optical pulses of different temporal widths may be about the same but the optical pulses of narrower temporal widths have less energy than the optical pulses of broader temporal widths.

In an embodiment, the transmitter controller 202 controls the duration of the optical pulse 110' as a function of an estimated distance to be measured. In an embodiment, the transmitter controller 202 shortens the duration of the optical pulse 110' as a function of shortening distance to be measured. That is, the duration of the optical pulse 110' is shorter for 10 m than that for 100 meters, for example.

In time-of-flight measurements, a width of the optical pulse determines the basic timing uncertainty in photon detection which also determines the accuracy of the distance measurement and the accuracy of the 3D image of the target 112 and its environment.

A shorter distance thus requires a shorter optical pulse because the shorter distance should be measured more accurately in absolute terms than a longer distance. The accuracy can be increased with a use of a shorter optical pulse. It can also be considered that a ratio of the length of an optical pulse and the measured distance should be as small as possible. An optical pulse of duration of 50 ps has a length about 1.5 cm. This is a good length for measuring distances in range tens of centimeters to a few meters, for example. An optical pulse of duration of 1 ns has a length about 3 m. This is a good length for measuring distances in range tens of meters to a few hundred meters or to even a plurality of kilometers, for example. On the other hand, a short optical pulse is not necessary for measuring long distances.

In an embodiment, the estimated distance is input to the transmitter controller 202 using a user interface 190 of the device 100. In an embodiment, the estimated distance is received by the transmitter controller 202 from a memory which has the distance data stored there. In an embodiment, the estimated distance is received by performing tentative distance measurements by the device 100. The tentative measurements may be one-dimensional measurements.

In an embodiment, the transmitter controller 202 may adjust a temporal width of an electric pulse input to the laser 200 on the basis of the received information in order to control the duration W of the optical pulse 110'.

In an embodiment, the transmitter controller 202 may adjust the temporal width W of the electric pulse in a range 1 ns to 10 ns in order to control the duration of the optical pulse 110' in a range 50 ps to 10 ns. When the temporal widths of the electric pulses are narrower than about 2 ns and the peak current is below a certain level, the laser 200 may operate in the enhanced gain switching regime. When the temporal width of the electric pulses are broader than about 2 ns and the amplitude is higher a certain level, the operation of the laser 200 may shift from the enhanced gain switching regime to some other regime for allowing longer optical pulses 110', 110. The other regime may be a quasi steady state.

In an embodiment, the transmitter controller 202 may adjust amplitude of the electric pulse input to the laser 200 for controlling the temporal width of the optical pulses 110', 110. In an embodiment, the transmitter controller 202 may adjust the amplitude of the electric pulse input on the basis of information related to the desired temporal width of the optical pulses 110', 110. In an embodiment, the transmitter controller 202 may adjust the width of the electric pulse input on the basis of information related to the desired temporal width of the optical pulses 110', 110. That is, the transmitter controller 202 may adjust the amplitude and/or width of the electric pulse input on the basis of information related to the desired temporal width of the optical pulses 110', 110. The width of the optical pulse output by the laser 200 may increase as a function of the increasing amplitude of the electrical pulse input to the laser 200. Correspondingly, the width of the optical pulse output by the laser 200 may decrease as a function of the decreasing amplitude of the electrical pulse input to the laser 200.

Figure 3:
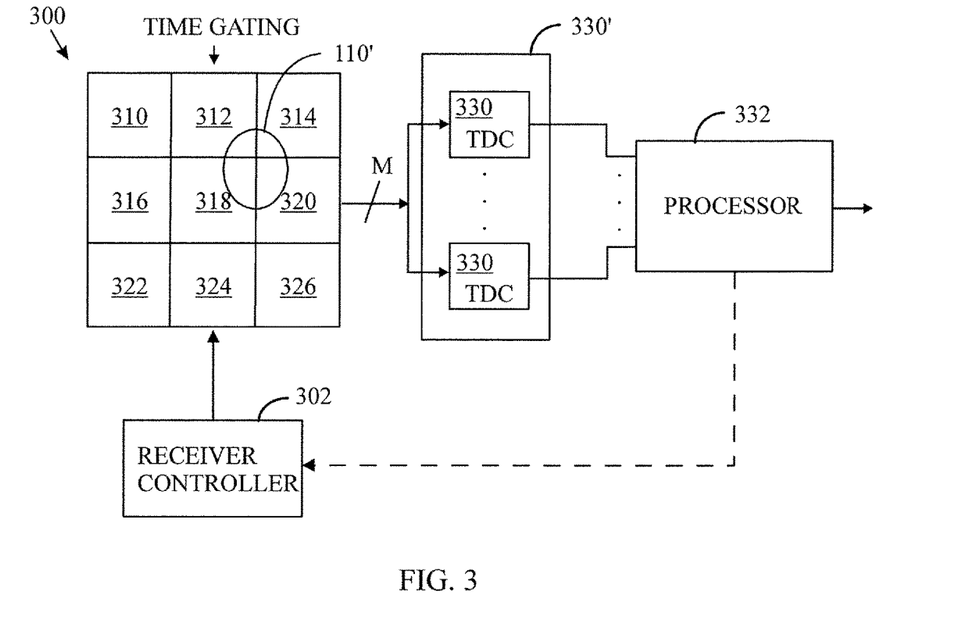
FIG. 3 illustrates an example of a receiver of the time-of-flight distance measurement device.

FIG. 3 illustrates an example of the detector 105 of the receiver 104 which comprises a matrix 300 of single photon avalanche detector elements 310 to 326 of a Geiger mode. The receiver 104 also comprises a receiver controller 302, and one or more time-to-digital converters 330.

Because the detector elements 310 to 326 operate in the Geiger mode, their output is digital in nature. That is, their output voltage levels may be set to conform to voltage levels of digital circuits which allows high measurement speed and accuracy. Their output also occurs in separate pulses the number of which are easy to count. Namely, the pulses are separated by dead time.

The single photon avalanche detector elements 310 to 326 of the matrix 300 detect an optical pulse 110' which has reflected from the target 112 and which hits the detector elements 310 to 326. Each of the single photon avalanche detector elements 310 to 326 outputs an electric signal in response to detection of the optical pulse 110'.

A number N of the time-to-digital converters 330 may be smaller than a number M of the single photon avalanche detector elements 310 to 326 of the matrix 300. That is, the receiver 104 may be made simpler than in a case where every element 310 to 326 has its own time-to-digital converter 330. In many cases, the beam of light hits only a part of the detector elements 310 to 326 which is why it is unnecessary complexity and space consumption to have so many time-to-digital converters. There may be a bank 330' of the time-to-digital converters 330.

The receiver controller 302 connects at least two of the single photon avalanche detector elements 310 to 326 with different time-to-digital converters 330.

The time-to-digital converters 330 connected with the single photon avalanche detector elements 310 to 326 provide timings of the detected optical pulse on the basis of each output electrical signal for determination of information associated with at least one distance of the target 112 on the basis of each timing. In other words, the receiver controller 302 connects at least one of the selected single photon avalanche detector elements 310 to 326 and one of the time-to-digital converters 330 with each other, and another at least one of the selected single photon avalanche detector elements 310 to 326 and one of the time-to-digital converters 330 with each other. Each of the determined timings refers to a distance between one part of the target 112 and the distance measuring device. Different determined distances thus give information about the shape of the target 112. In this manner, on the basis of two or more determined timings related to the distances of the target 112, a three dimensional image of the target 112 may be formed in a processing unit 332 of the distance measuring device.

The receiver controller 302 may select a part (for example 312, 314, 318 and 320) of the single photon avalanche detector elements 310 to 326, the number of which is equal to or smaller than the number of the one or more time-to-digital converters 330, and connect each of the selected single photon avalanche detector elements (312, 314, 318 and 320) and one of the time-to-digital converters 330 with each other. The receiver controller 302 may be controlled by the processing unit 332 which may also perform data processing and device control. The receiver controller 302 may be a part of the processing unit 332. That is, one selected single photon avalanche detector element is connected with one time-to-digital converter, and one time-to-digital converter is connected with one selected single photon avalanche detector element.

Each of the at least one time-to-digital converter 330 connected with the selected single photon avalanche detector elements (312, 314, 318 and 320) provides timing of the detected optical pulse in the selected single photon avalanche detector elements (312, 314, 318 and 320) on the basis of each output electrical signal. A determination of information associated with at least one distance of the target 112 is performed in a processing unit 332 on the basis of each timing. The information may refer to a single distance or a 3D image the target 112 on the basis of each of the timings.

In an embodiment, the receiver controller 302 may select the part of the single photon avalanche detector elements (312, 314, 318 and 320) in response to a detection of the optical pulse 110' among the single photon avalanche detector elements 310 to 326 of the matrix 300. Because each of the detector elements outputs an electric signal in response to detection, each of the electric signals may be used to identify an address or addresses of the part of the detector elements for the selection in order to couple it or them with the time-to-digital converters 330. Namely, each of the detector elements of the matrix 300 can be recognized and controlled separately because of their individual addresses. Also the time-to-digital converters 330 may have individual addresses for controlling them one by one. Those detector elements which are not selected are not connected with the time-to-digital converters 330.

In an embodiment, if the same at least one detector element performs detection of a plurality of temporally successive optical pulses 110', the receiver controller 302 may deselect said at least one detector element for at least one temporally next optical pulse. Additionally, the receiver controller 302 may select another at least one detector element in replacement to the deselection.

In an embodiment, if the same at least one detector element performs detection for predetermined times consecutively, the receiver controller 302 may deselect said at least one detector element for at least one temporally next optical pulse.

In an embodiment, if the same at least one detector element performs detection for five times in a row, the receiver controller 302 may deselect said at least one detector element for at least one temporally next optical pulse.

In this manner, a three dimensional image of the target 112 utilizing more than just the same at least one detector element may be formed. By selecting continually new detector elements for next optical pulses as long as all detector elements of the matrix 300 has been selected, a three dimensional image of the target 112 utilizing all the detector elements in the matrix 300 may be formed.

Figure 4:
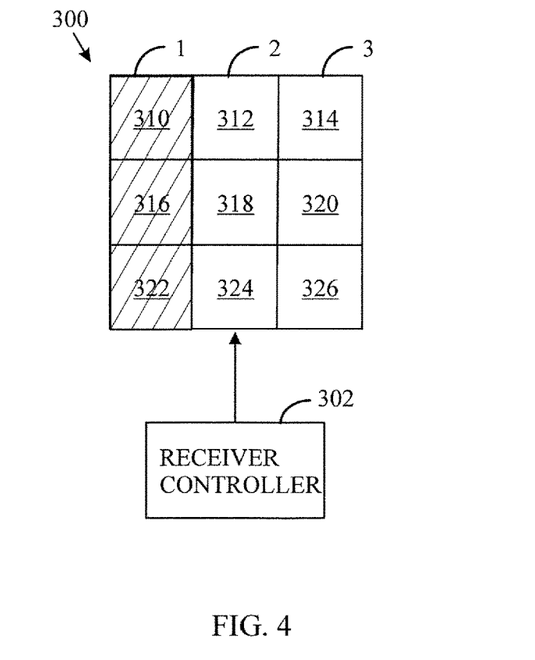
FIG. 4 illustrates an example of scanning over the matrix.

In an embodiment illustrated in FIG. 4, the receiver controller 302 may scan over the matrix 300 with successive parts 1, 2, 3 of selections, the successive parts 1, 2, 3 of the single photon avalanche detector elements 310 to 326 being different from each other for determination of a distribution of the distance of the target 112 on the basis of said timings. In an embodiment, the scanning may be performed over the whole matrix 300. In an embodiment, the scanning may be performed over a fraction of the matrix 300. In an embodiment, each of the selected part may be a column of the matrix 300, for example. In an embodiment, each of the selected part may be a row of the matrix 300, for example.

In an embodiment, the scanning may be performed over the matrix 300 column by column. Each column may have one pixel in a horizontal direction but all pixels vertically. In an embodiment, each column may be two pixels wide horizontally but include all pixels vertically. In an embodiment, each column may be HP pixels wide horizontally but include all pixels a vertical direction, where HP is at maximum half the number of pixels of the matrix 300 in the horizontal direction. In an embodiment, the maximum value of HP may be the number of pixels of the matrix in the horizontal direction minus one.

In an embodiment, the transmitter 105 may, synchronously with the scanning, only illuminate an area of the target 112 the image of which focuses on the scanned part of the matrix 300. At one moment, the transmitter 105 may illuminate an area of the target 112 the image of which focuses on a first scanned part, and at another moment, the transmitter 105 may illuminate an area of the target 112 the image of which focuses on a second scanned part. The scanning may be performed over the whole matrix 300. In this manner, the undesirable effects of noise and background reflections can be limited.

Figure 5:
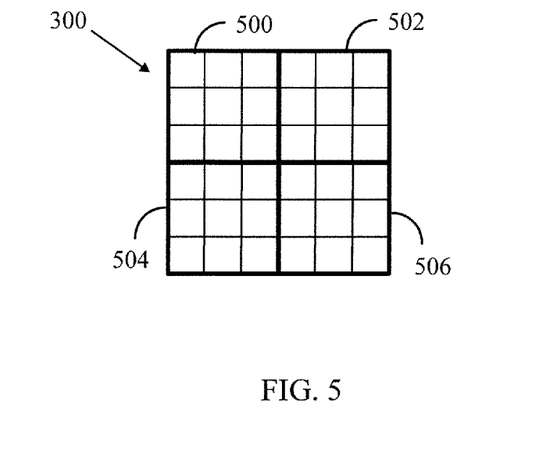
FIG. 5 illustrates an example of forming first a low resolution image and then a high resolution image.

In an embodiment illustrated in FIG. 5, the receiver controller 302 may select successively separate parts of a plurality of parts 500 to 506 of the matrix 300. The plurality of parts 500 to 506 may cover the whole matrix 300. Each part 500 to 506 may include at least one single photon avalanche detector element and a maximum number of the single photon avalanche detector elements of each part 500 to 506 is equal to the number of the time-to-digital converters 330.

The number of the parts 500 to 506 is equal to or smaller than the number of the time-to-digital converters 330.

The receiver controller 302 may connect one of the parts 500 to 506 and one of the time-to-digital converters 330 with each other such that the different parts are in connection with different time-to-digital converters 330. That is, one part is connected with one time-to-digital converter, and one time-to-digital converter is connected with one part.

The time-to-digital converters 330 connected with the parts 500 to 506 may provide timings of the detected optical pulse in the selected parts 500 to 506 for determination of a low resolution distance distribution of the target 112 on the basis of said timings. Each of the time-to-digital converter connected with a part may provide a single timing for the at least one signal coming from the part. The timing of a time-to-digital converter may relate to the first pulse coming from the part, for example. Alternatively, the timing may relate to an average timing of the at least one electric pulse, for example. In this manner, a low resolution 3D image may be formed of the target 112. The timings of the time-to-digital converters connected with the parts relate to distances of sections of the target 112 the image of which are formed on the separate parts 500 to 506.

In an embodiment, each of the time-to-digital converters 330 may provide a single timing in response to electric signals generated by each of the sections 500 to 506 having a plurality of the single photon avalanche detector elements 310 to 326.

In an embodiment, the receiver controller 302 may select successively each of the parts 500 to 506, and connect one of the single photon avalanche detector elements 310 to 326 of the selected part 500 to 506 and one of the time-to-digital converters 330 with each other such that the different selected single photon avalanche detector elements are in connection with different time-to-digital converters 330 for determination of a high resolution distance distribution of a target on the basis of said timings. The receiver controller 302 may thus connect one of the single photon avalanche detector elements 310 to 326 of the selected part 500 to 506 with only one of the time-to-digital converters 330. In this manner, a resolution inside each part 500 to 506 is increased and thus the resolution of the whole 3D image is increased.

In an embodiment, the receiver controller 302 may enable each of the selected part of the single photon avalanche detector elements 310 to 326 to detect in a time-gated window. Each of the enabled single photon avalanche detector elements may output an electric pulse in response to detection of a photon of optical radiation within the time-gated window.

In an embodiment, the receiver controller 302 may enable the selected part of the single photon avalanche detector elements 310 to 326 to detect in a plurality of time-gated windows such that at least two of the selected parts 500 to 506 have different time-gated windows with respect to each other. The different time-gated windows may not fully overlap. The different time-gated windows may, however, partially overlap or they may be temporally totally separate.

Figure 6:
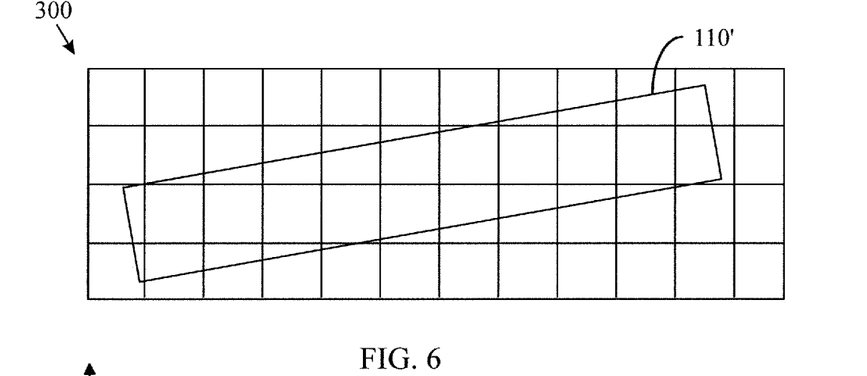
FIG. 6 illustrates an example of a rectangular matrix.

In an embodiment which is illustrated in FIG. 6, the laser 200 of the transmitter 105 may output an optical pulse 110' which is elongated in a horizontal direction. The optical pulses 110, 110' may not be perfectly horizontal but in any case the optical pulses 110, 110' have a larger dimension in the horizontal direction than that in the vertical direction. The matrix 300 of the single photon avalanche detector elements 310 to 326 may be a rectangle which is elongated in a horizontal direction. The elongation may be similar to that of the optical pulse 110'. In this embodiment, the receiver controller 302 may select the part of the single photon avalanche detector elements which perform a detection or detections of the optical pulse 110' among the single photon avalanche detector elements of the matrix 300. In this manner, the movement of the successive optical pulses 110' on the surface of the matrix 300 may be followed. In a similar manner, the optical pulse 110' and the matrix 300 may be elongated in a vertical direction.

In an embodiment of FIG. 6, information about the horizontal level of the elongated optical pulse 110' may only be required. The information may be based on an average level of the optical pulse 110' on the matrix 300. In general, the information may be based on any combination of pixels of the matrix 300 which detect the elongated optical pulse 110'.

Figure 7:
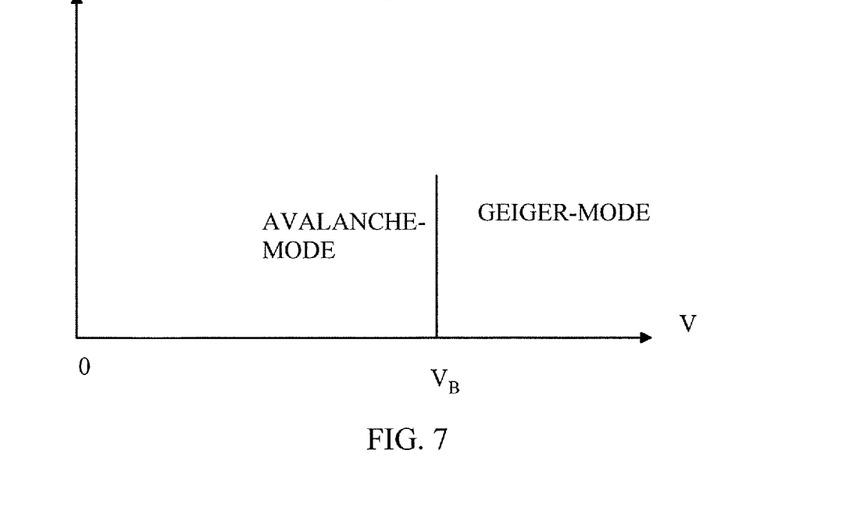
FIG. 7 illustrates an example of operation of the detector in an avalanche-mode and Geiger-mode.

FIG. 7 presents an avalanche-mode and the Geiger-mode. The detector elements 310 to 326 are made of semiconducting material and have a p-n junction which is reverse biased. In the avalanche-mode, the biasing voltage over the p-n junction is below a breakdown voltage VB. The amplification in the avalanche-mode is the higher the closer the biasing voltage is to the breakdown voltage VB. In the Geiger-mode, the biasing voltage over the p-n junction is above the breakdown voltage VB. In the avalanche-mode, the intensity of the electrical output of the detecting elements 310 to 326 depends linearly on the optical radiation i.e. the number of detected photons. To make the detection of photons more effective, the Geiger-mode may be used. In the Geiger-mode, the response of the detector elements 310 to 326 to optical radiation is non-linear and a single photon may cause the diode to output a strong electrical pulse. The amplification of detector elements in the Geiger-mode can be considered infinite which is substantially different from linear amplification of the avalanche-mode.

Figure 8A:
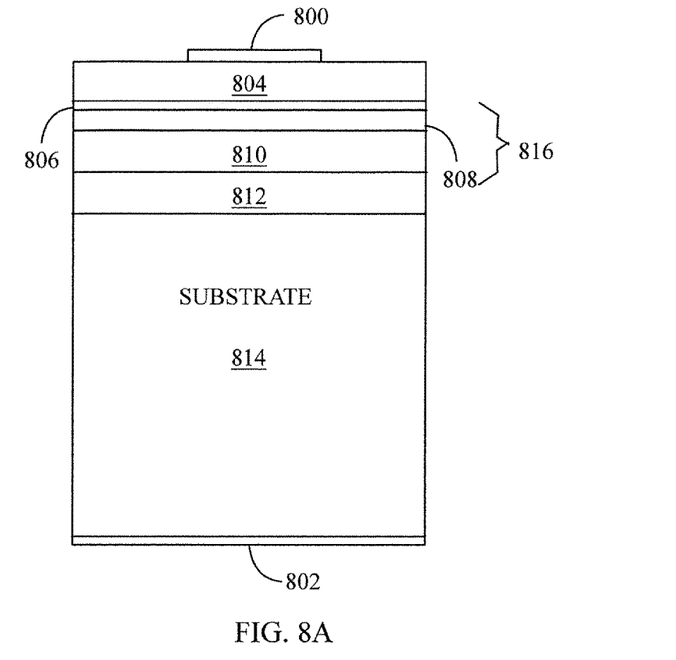
FIG. 8A illustrates an example of a structure of a semiconductor laser diode.
Figure 8B:
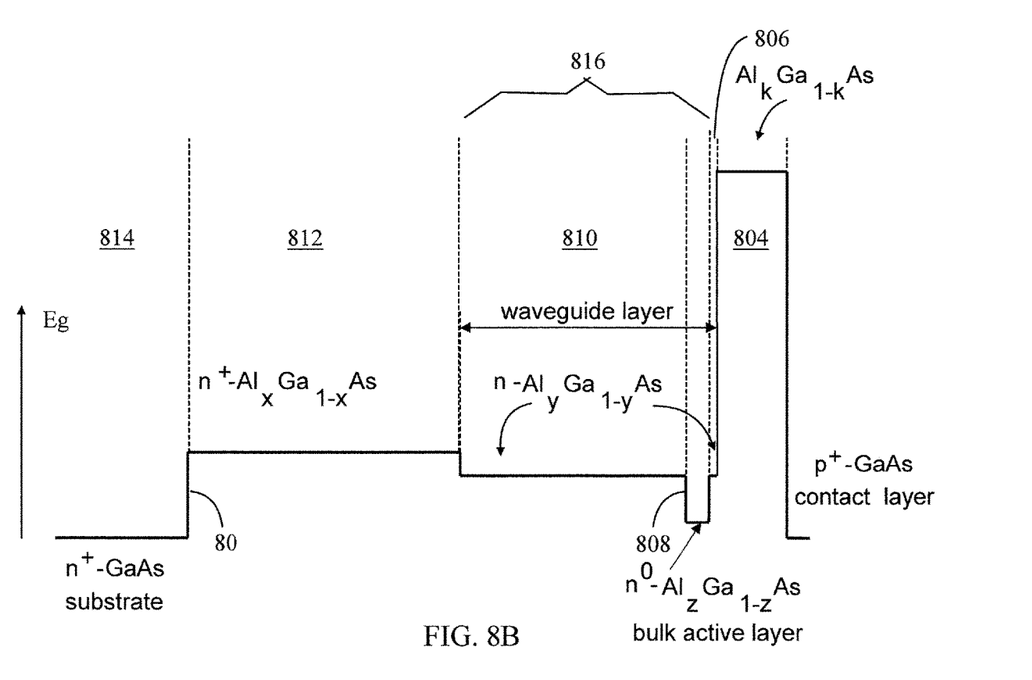
FIG. 8B illustrates an example of properties of the semiconductor laser diode.

An example of the semiconductor laser is explained in more detail in FIGS. 8A and 8B by examining an example of a semiconductor laser diode 200 based on, for example, aluminum gallium arsenide (AlGaAs). The line 80 presents in an arbitrary scale the value of an energy gap Eg between a conduction and a valence band. The laser may be layered in a double heterostructure between electrodes 800, 802, which may receive the electric power fed to the laser during operation. The electrodes 800, 802 may be metal contacts. The wide gap layer 804 may be high-doped p-type for donating excess holes. The structure from a high-doped wide gap layer 812 to the substrate 814 may be n-type for donating negative carriers. A complex narrow gap waveguide layered structure 816, which is an optical cavity for stimulated emission, may comprise layers 806 to 810, and the waveguide 816 may terminate at both ends in reflective surfaces at least one of which may finally transmit the optical pulse outwards. An active layer, where free electrons and holes exist and recombine by stimulated emission during the operation, may comprise the layer 808. The active layer 808 may be clearly much thinner than the whole waveguide 816 but much thicker than 10 nm, hence making the laser a bulk or multiple quantum wells (MQWs).

To illustrate the advantages of the proposed device, consider a simple standard lumped rate equation model for the averaged electron density N and photon density S in a semiconductor laser in the form $$dN/dt = i(t)/eV - N/\tau_n - v_g g(N,S)S, \quad (1)$$

$$dS/dt = v_g(\Gamma_a g(N,S) - \alpha)S + \Gamma_a \beta N/\tau_n, \quad (2)$$

where i is the injection current, e the electron charge, V=dLw is a volume of the active layer, with L the cavity length and w the stripe width and d the thickness of the active layer, $\tau_n(N) = 1 + B_1 N/(BN)$ is the carrier lifetime (B being the bimolecular recombination coefficient, and $B_1$ a correction coefficient taking into account saturation of the recombination rate at high N; for GaAs/AlGaAs material $B \approx 10^{-10}$ cm$^3$/s and $B1 \approx 10^{-19}$ cm$^3$), $\Gamma_a$ is an optical confinement factor, $v_g$ is the group velocity of light, $\alpha = \alpha_{out} + \alpha_{in}$ is the total (outcoupling and internal parasitic) cavity losses, and β is the spontaneous emission factor. For the gain-current density relation, a two-parameter logarithmic fit for both quantum well and bulk active layers may be expressed as follows:

$$g(N,S) = G_0 \ln(N/N_0)/(1+\varepsilon S), \quad (3)$$

where $N_0$ is the transparency carrier density and $G_0$ is a gain constant, and ε is the gain compression factor. An output power P of an optical pulse may be calculated from S using the formula:

$$P(t) = [(\hbar \omega/e)Lwd\alpha_{out}S(t)]/\Gamma_a, \quad (4)$$

where $\hbar$ is the Planck constant and ω is a photon energy.

The current profile i(t) is a pulse, which may be described by the expression:

$$i(t) = i_0\{\tanh[(t-2\tau_f)/\tau_r] - \tanh[(t-2\tau_f-\tau_p)/\tau_d]\} \quad (5)$$

with $\tau_p$ characterizing the pulse duration, $\tau_r$ the duration of the rising (leading) front, and $\tau_d$ that of the decaying (trailing) front. In our simulations, we took $\tau_r = \tau_d = 0.7$ ns, $\tau_p = 2$ ns.

An optical confinement factor $\Gamma_a$ can be defined as an overlap between gain medium and the optical mode. The confinement factor $\Gamma_a$ of a high power single QW CW operation laser may lie around 0.01.

In an embodiment, the semiconductor laser 200 may comprise a plane asymmetric waveguide 816 and an active layer 808 in the waveguide 816, the ratio of a thickness d of the active layer 808 to an optical confinement factor $\Gamma_a$ of the laser being larger than about 2.5 μm, for example. In an embodiment, the ratio of a thickness d of the active layer 808 to an active layer optical confinement factor $\Gamma_a$ may be larger than about 2.5 μm. In an embodiment, the laser 200 may operate in a single fundamental transverse mode. This kind of structure enables short optical pulses. This kind of structure also enables controllable duration of the optical pulses on the basis of variation of the width and/or the amplitude of a drive current pulse fed to the laser 200. A temporal width of a current pulse may be shorter than about 2 ns for the enhanced gain switching regime, for example. The width of the current pulse may be about 1 ns to 2.5 ns although the value about 2 ns has been used. Such current pulses cause the laser to output controllably variable optical pulses the temporal width of which may range from tens of picoseconds to hundreds of picoseconds. For longer temporal widths of the current pulses than about 2 ns the operation of the laser 200 may be normal gain switching at a low enough current level which allows the temporal widths of the optical pulses range from hundreds of picoseconds to a few nanoseconds, for example. That is, the enhanced gain switching operation results in the range from about tens of picoseconds to about hundreds of picoseconds for the optical pulses, and the quasi steady state results in the range of hundreds of picoseconds to a few nanoseconds for the optical pulses. There is a determined and/or continuous change in optical pulse width as a function with a width of the current pulse.

With a low amplitude current pulse the duration of which is shorter than about 2 ns only a short optical pulse (width one hundred of picosecond or less) will be generated in the state of the enhanced gain switching. By increasing the amplitude of the current pulse, a tail of the optical pulse 110B will appear and have more and more amplitude. Then the operation is moving from the enhanced gain switching to the quasi steady state. Finally, with a high enough current pulse a narrow optical peak 110A will not be separable or distinguishable (see FIG. 11B). When amplitude of the current pulse is high enough, the duration of a resulting optical pulse becomes about the same as that of the current pulse. Then the width of the optical pulse may be increased with an increasing width of the electric current pulse. That is the width of the generated optical pulse can be controlled with the amplitude of the current pulse and/or the width of the current pulse.

A person skilled in the art can easily find suitable amplitudes and widths of the current pulses by a few tests, from theory (see equations (1) to (5)) and/or on the basis of experience. The levels and/or the widths of current pulse may or may not be laser component-specific.

In an embodiment, the semiconductor laser 200 may operate in the gain switching regime on the basis of a plane asymmetric waveguide. The laser 200 may comprise an n-doped cladding layer 812 and a p-doped cladding layer 804, with the refractive index of the n-doped cladding layer 812 larger than that of the p-doped cladding layer 804. The laser 200 may comprise a waveguide layer 816 between the n-doped cladding layer 812 and the p-doped cladding layer 804, the waveguide layer 816 containing a first part and a second part and an active layer 808 between the first and second parts. A first end of the first part may be adjacent to the n-doped cladding layer 812 and a second end of the first part may be adjacent to a first end of the active layer 808. The first end of the first part may be directly adjacent to the n-doped cladding layer 812 and the second end of the first part may be directly adjacent to a first end of the active layer 808. The first end of the second part may be adjacent the p-doped cladding layer 804 and a second end of the second part adjacent a second end of the active layer 808. A thickness of the second part, corresponding to the distance between the active layer 808 and the p-doped cladding layer 804, may be less than a thickness of the first part, corresponding to the distance between the active layer 808 and the n-doped cladding layer 812. A refractive index of the first part may be constant, lower than that of the active layer 808 and larger than that of the n-doped cladding layer 812.

The laser 200 illustrated in FIGS. 8A and 8B is explained in more detail in the patent publication US20110134951.

Figure 9:
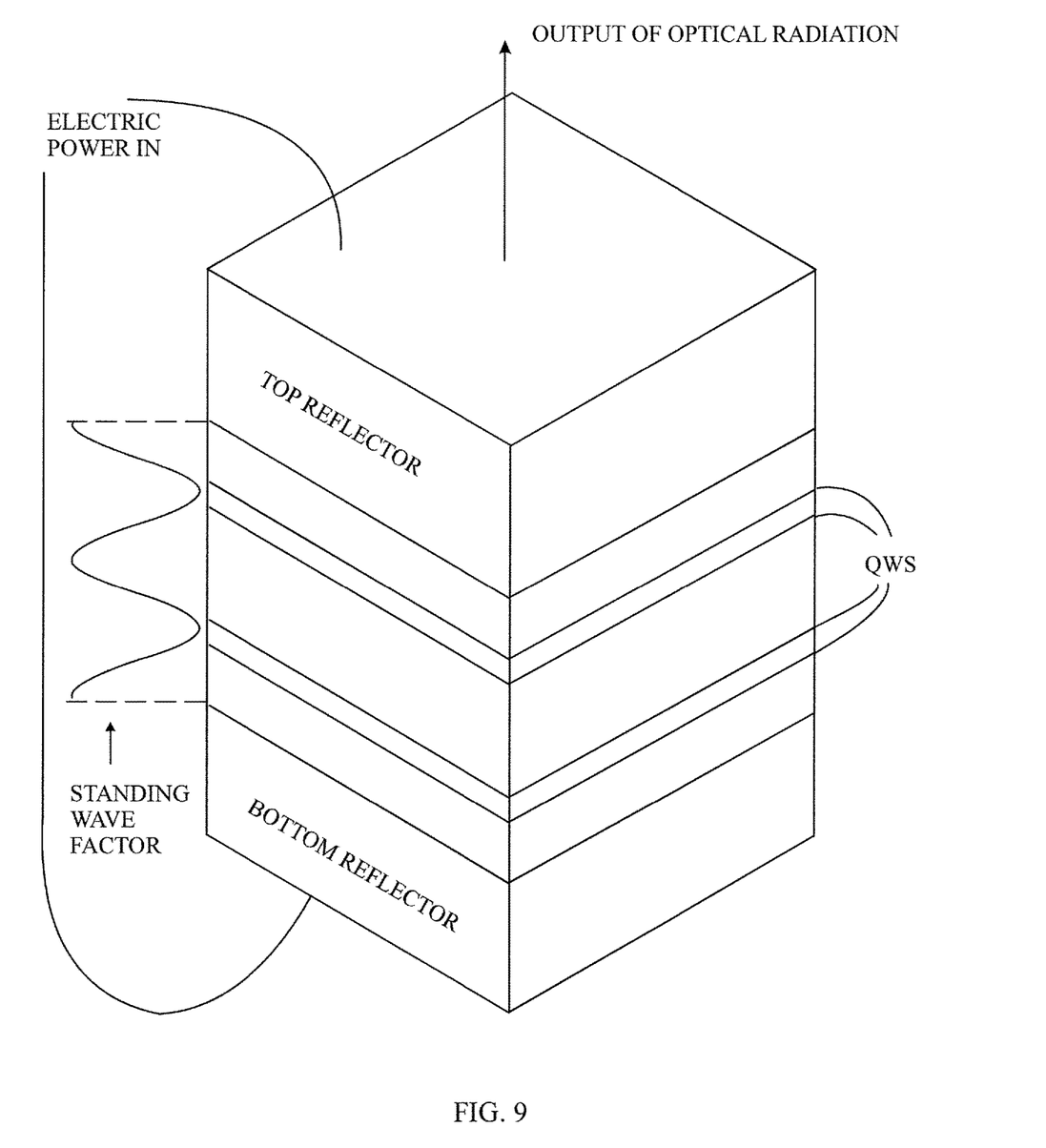
FIG. 9 illustrates an example of a layered structure of a vertical cavity surface emitting laser.

FIG. 9 presents an example of a layered structure of a vertical cavity surface emitting laser 200 (VCSEL). The transmitter 102 may have one VCSEL 200 or a plurality of VCSELs 200. The plurality of the VCSELs 200 may be arranged in an array. Both sides of the cavity with the quantum wells (QWs) there are the reflectors (top reflector, bottom reflector) through one of which the optical radiation is output. Distributed Bragg reflectors may comprise a stack of layers having regularly alternating reflection indices, the thickness of each layer in the Bragg reflector depending on its reflective index. FIG. 9 also shows the standing wave factor which resembles the actual standing wave in the cavity with respect to layered positions of quantum wells near the nodes of lower value than one.

When the laser 200 is a vertical cavity surface emitting laser, the laser 200 may operate in a gain switching regime. The cavity comprises at least one quantum well, each of which is located at a position where a value of a standing wave factor $\xi$ for each quantum well is between zero and one, $0<\xi<1$. The cavity is terminated by reflectors at both ends for enabling a standing wave of optical radiation therebetween.

In an embodiment, at least one of the reflectors at the ends of the cavity is a distributed Bragg reflector.

The VCSEL comprises a cavity terminated by top and bottom distributed Bragg reflectors (DBRs), and active layers inside the cavity one or more quantum wells (QWs) whose positions in the cavity are detuned from the standing wave antinodes in such a way that the standing wave factor for each quantum well is between zero and one, $0<\xi<1$.

Figure 10:
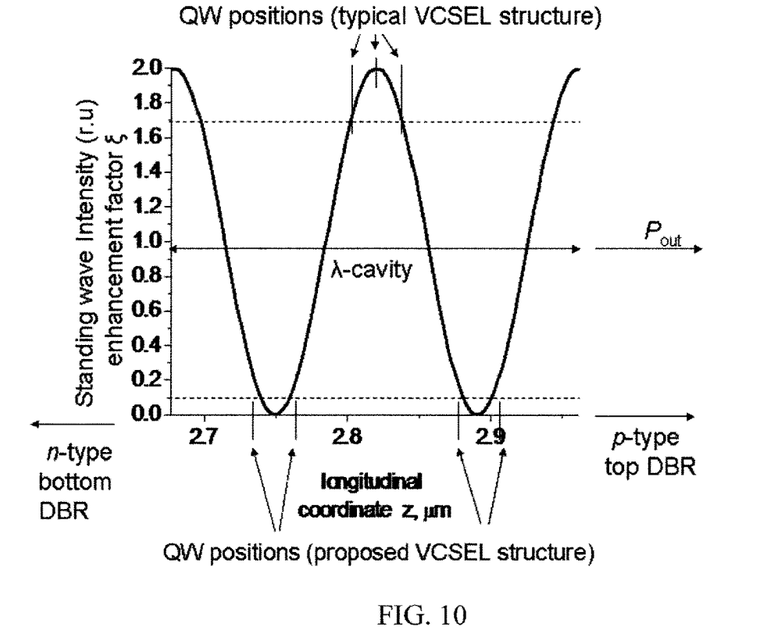
FIG. 10 illustrates an example of positions of quantum wells of a VCSEL laser.

FIG. 10 shows an example of a field intensity distribution in a VCSEL $\lambda$-cavity, with the quantum well positions in the standard prior art laser cavity (top) and the proposed cavity (bottom). To demonstrate the potential of the approach proposed, consider a typical gain switched AlGaAs/InGaAs VCSEL (Aluminum Gallium Arsenic/Indium Gallium Arsenic Vertical Cavity Surface Emitting Laser) intended for operating at a wavelength $\lambda$ of $\lambda=0.98$ μm, with a $\lambda$-cavity (as illustrated schematically in FIG. 10) terminated by AlGaAs/GaAs top and bottom DBRs (Distributed Bragg reflectors). Additionally or alternatively, at least one reflector may be of some other type of mirror. In a prior art "traditional" laser design, the active layer consists of three InGaAs quantum wells (QWs) located in small region associated with an antinode of the standing wave intensity profile in the middle of the cavity. Light is output to the direction shown by a straight line Pout in FIG. 10.

The laser 200 which is illustrated in FIGS. 9 and 10 is explained in more detail in a patent publication U.S. Pat. No. 8,934,514.

Figure 11A:
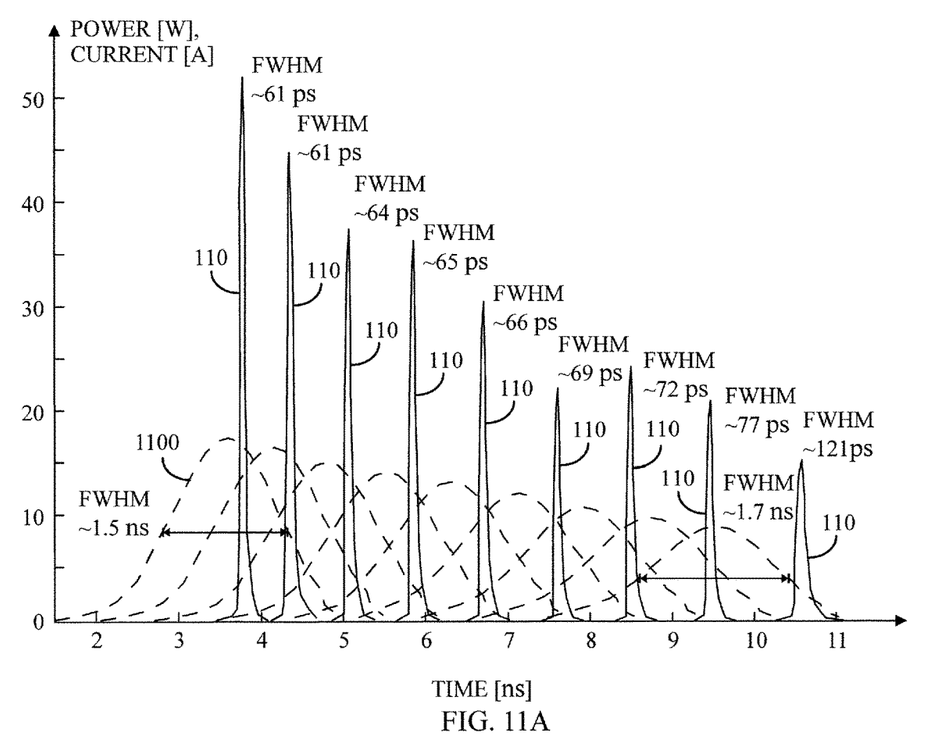
FIG. 11A illustrates an example of optical pulses as a function of narrow current pulses of an enhanced switching regime.
Figure 11B:
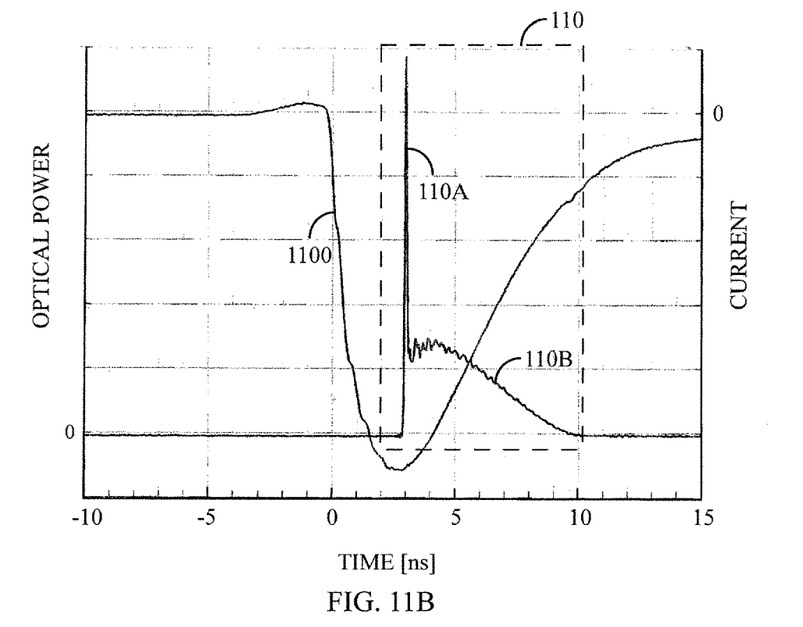
FIG. 11B illustrates an example of an optical pulse of a laser of a non-gain switching regime.

FIGS. 11A and 11B illustrate examples of dependence between laser current pulses and corresponding optical pulses from the laser 200. FIG. 11A illustrates examples where the laser 200 operates in the enhanced gain-switching regime. In FIG. 11A, laser current pulses 1100 are drawn with dashed lines and corresponding optical pulses 110 from the laser 200 are drawn with continuous line. The y-axis represents optical output power of the laser 200 in watts (W) and current input to the laser diode 200 in amperes (A), and the x-axis represents time in nanoseconds.

FIG. 11B illustrates an example where the laser 200 operates in a non-gain switched regime. The optical power is in arbitrary scale. Also the electrical current 1100 which is in the form of negative pulse is in arbitrary ampere scale. In FIG. 11B, the optical pulse 110 has a narrow peak 110A which resembles the short singular optical pulses of FIG. 11A. However, the optical pulse 110 in FIG. 11B also includes a tail 110B which is non-existent in an optical pulse of a semiconductor laser of the enhanced gain-switching regime. The total temporal width of the optical pulse 110 in FIG. 11B is about 8 ns (Full Width at Half Maximum about 6 ns). It can be seen on the basis of both FIGS. 11A and 11B that duration of an optical pulse depends on duration of a current pulse.

As can be seen on the basis of FIGS. 11A and 11B, the shorter the temporal width of a current pulse is made, the shorter the temporal width of an optical pulse becomes. The broader the temporal width of a current pulse is made, the broader the temporal width of an optical pulse becomes. In the non-gain-switched regime, the electric current pulse is broader and its energy is larger than those used in the enhanced gain-switching regime. That is why the peak 110A has more power than the optical pulses 110 in FIG. 11A. Additionally, a large or the most of the optical power of the whole optical pulse 110 is in the tail 110B.

Figure 12A:
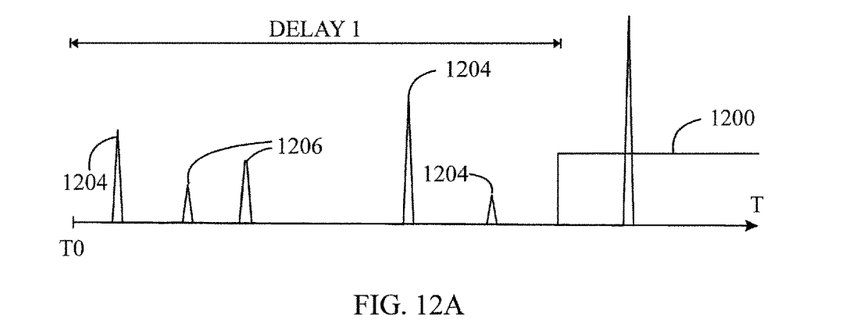
FIGS. 12A and 12B illustrate examples of the adaptive time-gating.
Figure 12B:
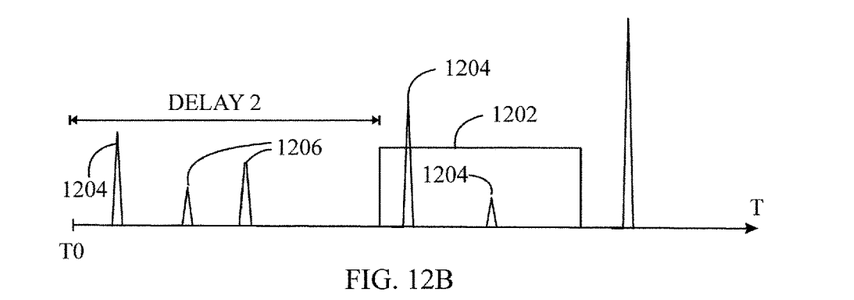

FIGS. 12A and 12B illustrate examples of the adaptive time-gating. FIGS. 12A and 12B may illustrate the time gated windows for two successive optical measurement pulses. The horizontal axis refers to time T. For example, the Geiger mode of the at least one detector element 310 to 326 may be switched on after a predetermined delay DELAY 1 from the moment T0 of the transmission of the optical measurement pulse in FIG. 12A. The Geiger mode of the at least one detector element 310 to 326 may be switched on after a predetermined delay DELAY 2 from the moment T0 of the transmission of the measurement pulse in FIG. 12B. The first delay DELAY 1 is longer than the second DELAY 2. The length of the delay may be set on the basis of the estimated distance to be measured. After the delay DELAY 1, DELAY 2 has gone, the detector elements 310 to 326 are capable of detecting. The reflections 604 of the background noise do not disturb the measurement when the DELAY 1 is used but some of said reflections 604 cause background noise when DELAY 2 is used. However, background noise is effectively limited. In this manner, the background reflections 604 during the adaptively chosen delay DELAY 1 have no effect to the detector elements 310 to 326 and to the measurement results.

Detecting optical radiation in a time-gated mode filters the background noise out effectively, since outside the time gated windows 1200, 1202 no optical pulses are taken into account in the measurement. No electric signals are taken into account either. Between optical measurement pulses the at least one detector element 310 to 326 can recover if they have been triggered by the background noise. That is an advantage. The background noise may include thermal noise generated in the measuring system and background light (sunshine, lamplight etc.) hitting the detector elements 310 to 326 of the measuring system.

Figure 13:
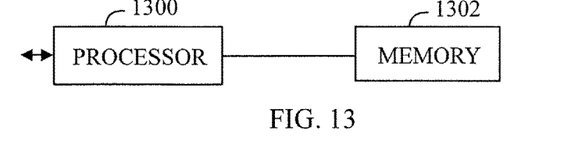
FIG. 13 illustrates an example of a transmitter controller, a receiver controller and/or a signal processing unit with one or more processors and one or more memories.

In an embodiment an example of which is illustrated in FIG. 13, the transmitter controller 202, the receiver controller 302 and/or the signal processing unit 332 comprises one or more processors 1300 and one or more memories 1302. The one or more memories 1302 may include also a computer program code. The one or more memories 1302 and the computer program code may, with the one or more processors 1300, cause the distance measurement device 100 at least to perform all steps required for the distance measurement. The signal processing unit 332 may control the whole operation of the distance measurement device 100.

The laser diode 200 may generate high-speed optical transients (<100 ps, >5 nJ) with relatively simple driving scheme for laser ranging and other optoelectronic measurement applications, especially for single photon measurements. The device may utilise an extremely large "equivalent spot size". From the point of view of dynamic behaviour, the use of this specialized construction results in "enhanced gain switching" and eventually in an efficient picosecond operation mode which is controllable such that also much longer optical pulse width may be generated.

The distance measuring device may form a 3D image of the target 112. Thus, the distance measurement device may be regarded as a fully digital laser scanner since it uses the adaptive optical pulses of the transmitter as its probe signal and digital detection based on Geiger-mode in the receiver.

Figure 14:
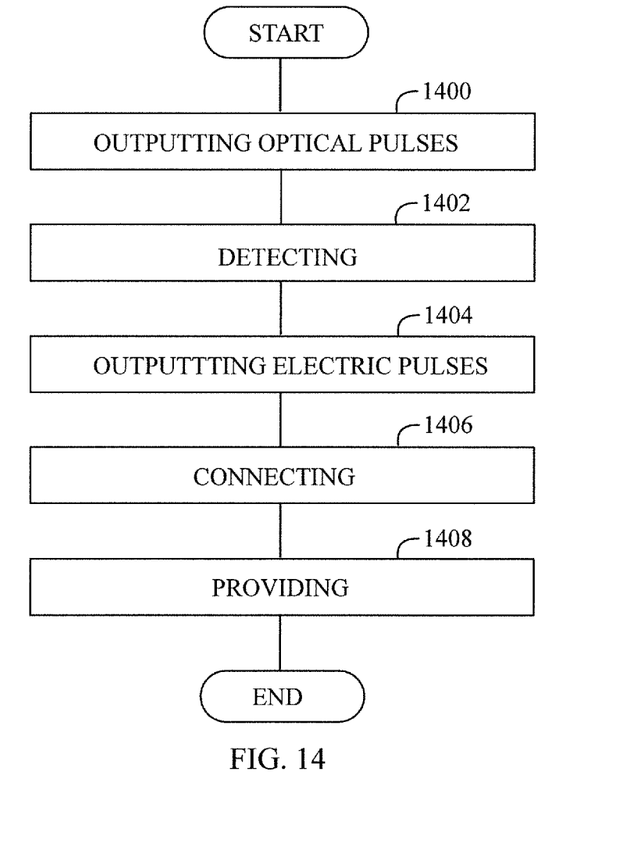
FIG. 14 illustrates an example of a flow chart of a distance measuring method.

FIG. 14 is a flow chart of the measurement method. In step 1400, the optical pulse 110', 110 of controllably variable temporal widths by the semiconductor laser 200 is output by the semiconductor laser 200 operating in an enhanced switching regime for the optical pulses of a minimum generable temporal width of the laser 200. In step 1402, the optical pulse reflected from the target 112 to a matrix 300 of single photon avalanche detector elements 310 to 326 of a Geiger mode is detected in a receiver 104. In step 1404, an electric pulse is output by the single photon avalanche detector element 310 to 326 in response to each detection. In step 1406, at least two of the single photon avalanche detector elements 310 to 326 are connected with different time-to-digital converters 330 by a receiver controller 302. In step 1408, timings of the optical pulse detected in the selected single photon avalanche detector elements are provided by the time-to-digital converters 330 on the basis of each output electrical signal for determination distance associated information of a target 112 on the basis of each timing.

The method shown in FIG. 14 may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

The computer program may be distributed using a distribution medium which may be any medium readable by the transmitter controller 202, the receiver controller 302 and/or the signal processing unit 332. The medium may be a program storage medium, a memory, a software distribution package, or a compressed software package. In some cases, the distribution may be performed using at least one of the following: a near field communication signal, a short distance signal, and a telecommunications signal.

The above explained distance measurement device utilizes a generic 3D imager technology that meets the needs for current and future applications and is scalable according to those needs in terms of performance parameters. Thus, the distance measurement device may be used to observe moving objects and/or objects which may change shape as a function of time. The time scale for change of shape may be seconds, minutes or hours.

It will be obvious to a person skilled in the art that, as technology advances, the inventive concept can be implemented in various ways. The invention and its embodiments are not limited to the example embodiments described above but may vary within the scope of the claims.

What is claimed is:

1. A transmitter of an optical time-of-flight distance measuring device, wherein the transmitter comprises a transmitter controller and a semiconductor laser, the semiconductor laser having a ratio of thickness d of an active layer to an optical confinement factor Γa that is larger than about 2.5 μm, the transmitter controller being configured to control the semiconductor laser to output optical pulses of controllably variable temporal widths, the transmitter controller being further configured to control the semiconductor laser to operate in an enhanced gain switching regime for the optical pulses of a shorter temporal width of the laser, and in a different regime of a quasi steady state for a longer optical pulse, said optical pulse of the shorter temporal width including no tail and said longer pulse including a tail; wherein the transmitter controller is configured to control a duration of the optical pulses.

2. The transmitter of claim 1, wherein the transmitter controller is configured to adjust amplitude and/or a temporal width of an electric pulse input to the laser for controlling a temporal width of the optical pulses.

3. The transmitter of claim 2, wherein the transmitter controller is configured to adjust the temporal width of the electric pulse in a range 1 ns to 10 ns in order to control the duration of the optical pulse in a range 50 ps to 10 ns.

4. A receiver of an optical time-of-flight distance measuring device, wherein the receiver comprises a matrix of single photon avalanche detector elements of a Geiger mode, a receiver controller, and one or more time-to-digital converters;
the single photon avalanche detector elements of the matrix are configured to detect optical pulses sent by the transmitter of claim 1 and reflected from a target to the matrix, and each of the single photon avalanche detector element is configured to output an electric signal in response to each detection;
a number of the time-to-digital converters is smaller than a number of the single photon avalanche detector elements of the matrix;
the receiver controller is configured to connect at least two of the single photon avalanche detector elements with different time-to-digital converters; and
the time-to-digital converters connected with the single photon avalanche detector elements are configured to provide timings of the detected optical pulses on the basis of each output electrical signal for determination of information associated with a distance of the target on the basis of each timing.

5. The receiver of claim 4, wherein the receiver comprises a processing unit configured to form a three dimensional image of the target on the basis of the two or more determined timings related to the distances of the target.

6. The receiver of claim 4, wherein the receiver controller is configured to select a part of the single photon avalanche detector elements, the number of which is equal to or smaller than the number of the one or more time-to-digital converters, and connect any one of the selected single photon avalanche detector elements with only one of the time-to-digital converters; and
the time-to-digital converters connected with the selected part of the single photon avalanche detector elements are configured to provide timings of the detected optical pulse on the basis of each output electrical signal for determination of information associated with distances of the target on the basis of each timing.

7. The receiver of claim 6, wherein the receiver controller is configured to select the part of the single photon avalanche detector elements in response to a detection of the optical pulse among the single photon avalanche detector elements of the matrix.

8. The receiver of claim 6, wherein the receiver controller is configured to scan over the matrix with successive parts of selections, the successive parts of the single photon avalanche detector elements being different from each other for determination of a distribution of the distance of the target on the basis of said timings.

9. The receiver of claim 4, wherein the receiver controller is configured to select a plurality of parts of the matrix, where each part is configured to include at least one single photon avalanche detector element, and a maximum number of the single photon avalanche detector elements of each part being equal to the number of the time-to-digital converters;
the number of the parts is equal to or smaller than the number of the time-to-digital converters;
the receiver controller is configured to connect any one of the parts with only one of the time-to-digital converters; and
the time-to-digital converters connected with the parts are configured to provide timings of the detected optical pulse in the selected parts for determination of a low resolution distance distribution of the target on the basis of said timings.

10. The receiver of claim 9, wherein each of the time-to-digital converter is configured to provide a single timing in response to electric signals generated by the connected part having a plurality of the single photon avalanche detector elements.

11. The receiver of claim 9, wherein the receiver controller is configured to select successively each of the parts, and connect any one of the single photon avalanche detector elements of the selected part with only one of the time-to-digital converters for determination of a high resolution distance distribution of the target on the basis of said timings.

12. The receiver of claim 4, wherein the receiver controller is configured to enable each of the selected part of the single photon avalanche detector elements to detect in a time-gated window, and each of the enabled single photon avalanche detector element is configured to output an electric pulse in response to detection of a photon of optical radiation within the time-gated window.

13. An optical time-of-flight distance measuring device, wherein the device comprises a transmitter and a receiver;
the transmitter comprises a transmitter controller and a semiconductor laser, the semiconductor laser having a ratio of thickness d of an active layer to an optical confinement factor Fa that is larger than about 2.5 μm, the transmitter controller being configured to control the semiconductor laser to output optical pulses of controllably variable temporal widths, the transmitter controller being further configured to control the semiconductor laser to operate in an enhanced switching regime for the optical pulses of a shorter temporal width of the laser, and in a different regime of a quasi steady state for a longer optical pulse, said optical pulse of the shorter temporal width including no tail and said longer pulse including a tail; wherein the transmitter controller is configured to control a duration of the optical pulses;
the receiver comprises a matrix of single photon avalanche detector elements of a Geiger mode, a receiver controller, and one or more time-to-digital converters;

the single photon avalanche detector elements of the matrix are configured to detect optical pulses sent by the transmitter and reflected from the target to the matrix, and each of the single photon avalanche detector element is configured to output an electric signal in response to each detection;

a number of the time-to-digital converters is smaller than a number of the single photon avalanche detector elements of the matrix;

the receiver controller is configured to connect at least two of the single photon avalanche detector elements with different time-to-digital converters; and the time-to-digital converters connected with the single photon avalanche detector elements are configured to provide timings of the detected optical pulses on the basis of each output electrical signal for determination of information associated with a distance of the target on the basis of each timing.

14. The optical time-of-flight distance measuring device of claim 13, wherein the laser transmitter is configured to output a pulsed optical beam which is elongated in a horizontal direction; and the matrix of the single photon avalanche detector elements is a rectangle which is elongated in a horizontal direction.

15. A method for measuring distance with an optical time-of-flight device, wherein the method comprises:

having a semiconductor laser being having a ratio of thickness d of an active layer to an optical confinement factor Fa that is larger than about 2.5 µm;

outputting optical pulses of controllably variable temporal widths by the semiconductor laser operating in an enhanced switching regime for the optical pulses of a shorter temporal width of the laser, and in a different regime of a quasi steady state for a longer optical pulse, said optical pulse of the shorter temporal width including no tail and said longer pulse including a tail, the duration of the optical pulses being controllable;

detecting, in a receiver, the optical pulses reflected from the target to a matrix of single photon avalanche detector elements of a Geiger mode;

outputting an electric pulse by the single photon avalanche detector element in response to each detection;

connecting, by a receiver controller, at least two of the single photon avalanche detector elements with different time-to-digital converters; and providing, by the time-to-digital converters, timings of the optical pulses detected in the selected single photon avalanche detector elements on the basis of each output electrical signal for determination distance associated information of the target on the basis of each timing.

16. The method of claim 15, further comprising selecting a part of the single photon avalanche detector elements, the number of which is equal to or smaller than the number of the time-to-digital converters, and connecting any one of the selected single photon avalanche detector elements with only one of the time-to-digital converters; and wherein the time-to-digital converters connected with the selected part of the single photon avalanche detector elements are configured to provide timings of the detected optical pulse on the basis of each output electrical signal for determination of information associated with distances of the target on the basis of each timing.

17. The method of claim 16, further comprising selecting the part of the single photon avalanche detector elements in response to a detection of the optical pulse among the single photon avalanche detector elements of the matrix.

18. The method of claim 16, further comprising scanning over the matrix with successive parts of selections, the successive parts of the single photon avalanche detector elements being different from each other for determination of a distribution of the distance of the target on the basis of said timings.

19. The method of claim 15, further comprising selecting a plurality of parts of the matrix, where each part is configured to include at least one single photon avalanche detector element, and a maximum number of the single photon avalanche detector elements of each part being equal to the number of the time-to-digital converters;

wherein the number of the parts is equal to or smaller than the number of the time-to-digital converters;

wherein the receiver controller is configured to connect any one of the parts with only one of the time-to-digital converters; and wherein the time-to-digital converters connected with the parts are configured to provide timings of the detected optical pulse in the selected parts for determination of a low resolution distance distribution of the target on the basis of said timings.

20. The method of claim 19, wherein each of the time-to-digital converter is configured to provide a single timing in response to electric signals generated by the connected part having a plurality of the single photon avalanche detector elements.

* * * * *